Sept. 18, 1956  N. KRASNEY  2,763,793
REVERSIBLE STEPPER MOTOR
Filed Jan. 25, 1954  2 Sheets-Sheet 1

INVENTOR:
Norman Krasney
By Herbert E. Metcalf
His Patent Attorneys

Sept. 18, 1956  N. KRASNEY  2,763,793
REVERSIBLE STEPPER MOTOR
Filed Jan. 25, 1954  2 Sheets-Sheet 2

INVENTOR:
Norman Krasney
By Aubert E. Metcalf
His Patent Attorney

United States Patent Office 2,763,793
Patented Sept. 18, 1956

2,763,793

REVERSIBLE STEPPER MOTOR

Norman Krasney, Los Angeles, Calif., assignor to Northrop Aircraft, Inc., Hawthorne, Calif., a corporation of California Application January 25, 1954, Serial No. 405,861

13 Claims. (Cl. 310—20)

The present invention relates to electromechanical devices and more particularly to a bi-directional electromechanical stepper motor.

Control mechanisms generally utilized in guidance systems, navigational systems, computing devices, and etc., are frequently designed to be operated by remote control. Such an operation usually requires that a driven member be precisely adjusted to a plurality of positions. One method of accomplishing such adjustments is by means of a stepper motor operable by electrical pulses. Such a motor, especially when utilized with complex machinery, is required to accurately produce a predetermined incremental rotational movement which in turn is imparted to a driven member of an associated device or system. A problem not yet satisfactorily solved is that infrequently the motor fails to produce the desired output for one or more of a series of pulses, accordingly a false output or position is imparted to the driven member.

Although the device of the instant invention is referred to as a motor or stepper motor throughout the specification and claims it does not provide continuous unidirectional rotary movement. The motor functions to provide an output shaft with a predetermined incremental rotational movement in a clockwise direction, a counter-clockwise direction, or alternate clockwise and counter-clockwise movements in accordance with electrical pulses supplied to the motor. For example the motor disclosed herein may be utilized to position certain elements of a gear train associated with a guidance system of an aircraft, however, it may be utilized for many other purposes.

It is an object of this invention to provide a stepper motor capable of accurately transforming and transmitting electrical input signals to an output member thereof in the form of incremental rotational movements in either a clockwise or counter-clockwise direction.

Another object of this invention is to provide a stepper motor capable of imparting pre-determined incremental bi-directional rotational movement to an output member, the driving member of the motor being free of the possibility of jamming or stalling on either a power or a return stroke.

Another object of this invention is to provide a stepper motor the component parts of which do not require super-critical tolerance and alignment as required of similar apparatus to insure its proper operation.

Another object of the invention is to provide a stepper motor in which limited axial movement may be imparted to the output member thereof without affecting the operation of the motor.

Another object of the invention is to provide a stepper motor which is simple and compact in design and construction, economical to manufacture, and flexibility adapted to cooperate with various devices with which it may be utilized.

These and other objects will become apparent from the following description and drawing in which like reference characters denote like parts. It is to be expressly understood however, that the drawings are for the purpose of illustration only and not a definition of the limits of the invention, reference being had for this purpose to the appended claims. In the drawings:

Figure 1:
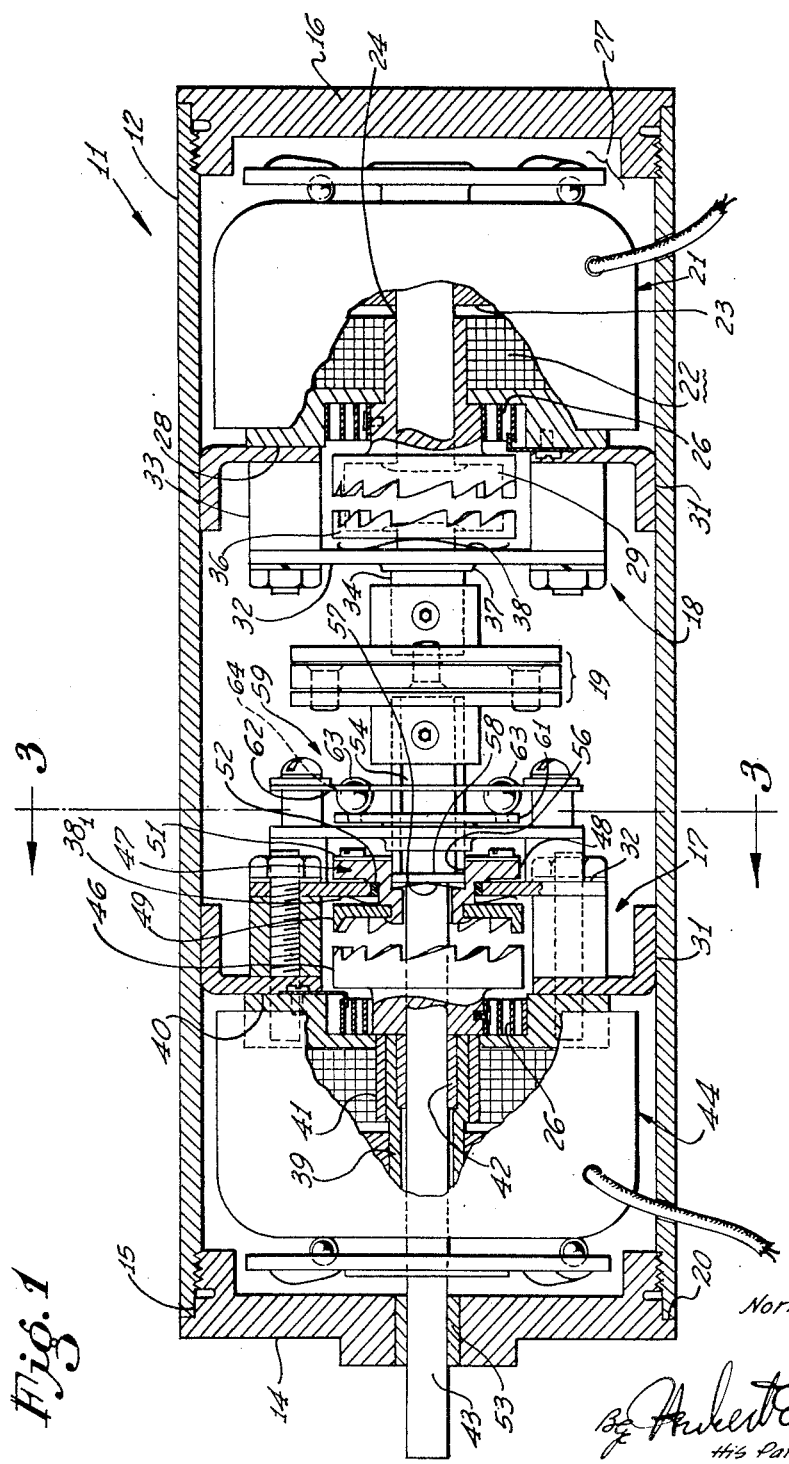
Figure 1 is an elevational view of a preferred embodiment of a stepper motor as disclosed in the instant invention, certain parts thereof being shown in section while others are broken away to more effectively show their construction.

Referring to the drawings for a detailed description of a preferred embodiment of the present invention, Figure 1 shows a stepper motor 11 the operational parts of which are mounted in a cylindrical housing 12. The housing is closed by cap members 14 and 16 threadably engaging the inside of the housing. The cap members provide concentric disks which are located by means of lands 15 formed on the cap members. The cap members are located longitudinally with respect to the housing by shoulders 20 which abut the ends of the housing.

The operational parts of the stepper motor comprise a pair of rotary solenoid assemblies 17 and 18 which are operationally connected by an anti-backlash flexible coupling 19. The solenoid assembly 18, shown at the right in Figure 1, is for the most part of conventional construction. This assembly includes a solenoid 21 comprising an electromagnetic coil 22, an armature 23, a solenoid shaft 24, a spiral spring 26, and ball bearing means 27. The ball bearing means functions on the incline plane principle.

Accordingly when the coil 22 is energized a magnetic force of sufficient magnitude is generated to move armature 23 toward the coil 22. As the armature moves toward the coil, shaft 24 is caused to rotate due to the ball bearing means 27 functioning in a conventional manner. For purposes of illustration it is assumed a 45° rotational stroke and an axial stroke of approximately .055 of an inch is imparted to the armature 23 and shaft 24 each time the coil 22 is energized. Upon de-energization of the coil 22 the armature and shaft are returned to their initial position by the combined action of spring 26 and ball bearing means 27.

The shaft 24 extends a short distance beyond the face 28 of solenoid 21. Attached to this extending end is a ratchet drive wheel 29 mounted for rotation with the shaft. A generally cup shaped mounting member 31 is attached to face 28 of the solenoid and is provided with a central aperture through which the shaft 24 extends.

An alignment plate 32 is positioned in parallel spaced relation with respect to face 28 of the solenoid by means of spacers 33 and is held in position by means of studs or the like. A secondary shaft 34 is rotatably mounted in plate 32 with its axis co-axial with the axis of shaft 24. Mounted on the shaft 34 is a ratchet wheel 36 so positioned that its teeth are in opposing relation with respect to the teeth on wheel 29. The teeth on wheels 29 and 36 are adapted to mate with each other during certain phases of the operation of the solenoid 21. Axial movement of the shaft 34 and wheel 36 is precluded in a direction toward wheel 29 by a retaining ring 37 positioned on shaft 34 and bearing against the alignment plate 32. A spring washer 38 surrounding the shaft 34, and positioned between plate 32 and wheel 36, permits shaft 34 and wheel 36 to move a predetermined axial distance away from wheel 29. At such times as the coil 22 is de-energized, and shaft 24 is at rest, ratchet wheels 29 and 36 are spaced apart longitudinally a few thousandths of an inch, this clearance permits rotation of the ratchet wheel 36 without interfering with ratchet wheel 29.

The solenoid assembly 17 includes parts similar to those described above in connection with assembly 18, however, its solenoid shaft 39 is hollow. The shaft 39 is rotatably supported by a pair of bronze bearings 41 (only one of which is shown). A bearing 42 positioned in the hollow portion of shaft 39 provides a first support for an output shaft 43 of the stepper motor 11. A ratchet wheel 46 is attached to the end of shaft 39 which extends beyond the face 40 of solenoid 44.

An alignment plate 32 and mounting member 31 are attached to solenoid 44 in the same manner that corresponding elements are attached to the solenoid 21. Rotatably mounted on the alignment plate 32 is a driven ratchet wheel assembly 47 comprising a mounting member 48, a driven ratchet wheel 49, and a driving plate 51. The member 48 comprises an annular disk portion and an annular bearing portion, the latter extending a suitable distance through a central aperture in the plate 32. Fixedly secured to the bearing portion of member 48, that is the portion extending through plate 32, is the ratchet wheel 49. Axial movement of member 48 and wheel 49 is precluded in a direction toward wheel 46 by a shoulder on the disk portion of member 48 bearing against the alignment plate 32. A spring washer $38_1$ surrounding the bearing portion of member 48 and positioned between plate 32 and wheel 49 permits member 48 and wheel 49 to move a predetermined axial distance in a direction away from the wheel 46. At such times as the coil 22 of solenoid 44 is de-energized, and shaft 39 is at rest, ratchet wheels 46 and 49 are spaced apart longitudinally a few thousandths of an inch, this clearance permits rotation of ratchet wheel 49 without interfering with the wheel 46. A bearing 52 positioned in the central aperture of plate 32 provides suitable support and allows rotational movement of assembly 47.

The shafts 39 and 43, ratchet wheels 46 and 49, and member 48 are all in axial alignment. The output shaft 43 passes through the hollow portion of shaft 39 and extends a suitable distance beyond the cap member 14. A bearing 53 in the member 14 provides a second support for the shaft 43. The other end of shaft 43 extends beyond the member 48 for attachment to the coupling 19. This latter end of shaft 43 is somewhat larger in diameter than the portion passing through the shaft 39 and is provided with flat portions as indicated at 54. The enlarged portion of shaft 43 enters a counterbore 56 in member 48. A spring washer 57 surrounds shaft 43 and is positioned between the bottom of bore 56 and a plain washer 58 contacting the shoulder occurring between the large and small portions of shaft 43. The aperture in the driving plate 51 is shaped so that the plate slidably contacts the flat surfaces 54 of the shaft 43 to transmit rotary movement between this shaft and assembly 47.

The solenoid assembly 17 also includes a conventional detent assembly 59. This assembly comprises a disk 61 adapted to rotate with shaft 43, a fixed flexible member 62 spaced from disk 61, and a plurality of steel balls 63 positioned between disk 61 and member 62. The balls 63 remain seated in the embossments or holes 64 formed in the member 62 and in certain of a plurality of circularly located holes 66 in the disk 61 according to its angular position. As the shaft 43 and disk 61 rotate the latter exerts an axial force on member 62, the force being transmitted through balls 63, accordingly the member 62 is flexed axially allowing the balls 63 to move between adjacent holes 66 in the disk 61. The holes 66 are spaced apart 30° in the particular embodiment shown. An aperture conforming to the cross-sectional outline of the shaft 43 is provided in the driving disk 61. This aperture provides a sliding fit between the disk 61 and shaft 43 but permits rotational movement of the shaft to be transmitted to the disk. Accordingly the shaft 43 is not restricted in its limited axial movement by any of the component parts of the detent assembly.

The solenoid assemblies 17 and 18 are interconnected by means of the flexible coupling 19 which is attached to the free ends of shafts 34 and 43 adjacent the detent assembly. The solenoid assemblies are positioned in the housing 12 and secured therein by means of the members 31 substantially as shown in Figure 1. Perfect alignment of assemblies 17 and 18 is not absolutely essential as the coupling 19 compensates for a certain amount of misalignment. The coupling also serves another purpose which will become apparent during the operational description of the motor.

The operation of the stepper motor during a power and return stroke will now be described. In this discussion it is assumed that upon energizing the solenoid 44 ratchet wheel 46 is rotated clockwise through an angle of forty-five degrees (45°) when viewed from the left in Figure 1, similarly wheel 29 is rotated through an angle of forty-five degrees (45°) when solenoid 21 is energized but in a counter-clockwise direction. Angular movement is imparted to the wheels 29 and 46 by the action of respective ball bearing means 27.

It is also assumed that each tooth on the wheels 29, 36, 46, and 49 embrace one-twelfth (1/12) of the periphery of each wheel or an angular distance of thirty degrees (30°). The rest or detent positions of wheels 36 and 49 are so determined that either of the wheels 29 or 46 will rotate through an angle of fifteen degrees (15°) and progress axially a small distance before they contact the mating teeth on wheels 36 and 49, respectively. The wheels 36 and 49 are then driven through a thirty degree (30°) arc by the drive wheels 29 or 46, respectively. At the same time that the wheels 36 and 49 are being rotated the disk 61 will be rotated an equal amount. The force exerted by the balls 63 will overcome the restraining force of flexible member 62, the balls 63 will be forced out of presently occupied holes or indentations 66 and will bottom themselves in the next adjacent holes or indentations. Accordingly it is seen that the output shaft 43 is driven either clockwise or counter-clockwise through an angle of thirty degrees (30°) depending on which solenoid is energized. The output shaft 43, coupling 19, and ratchet wheels 36 and 49 are retained in their new angular position by the detent assembly 59 until such time as either of the solenoids are again energized.

At such time as either solenoid is de-energized the driving ratchet wheel, that is the ratchet wheel associated with the solenoid just de-energized, will be returned to its initial or starting position by a respective spring 26. During the return angular stroke of either of the wheels 29 or 46 the shallow sloping surfaces of their teeth will contact the sloping surfaces of the teeth located on wheels 36 or 49, respectively. This contacting of mating teeth would normally result in an axial movement of the shafts 24 or 39, as the case may be, in excess of that imparted thereto by respective ball bearing means 27. Should such excessive axial movement of either of the shafts 24 or 39 occur the balls of the associated bearing means 27 will not be subject to pure rolling but will probably be jarred out of phase with respect to each other. Under such circumstances the balls will not be identically positioned in their respective races at the end of a solenoid's return stroke. This out of phase relationship may result in a jamming or stalling failure during the following power stroke in a manner which is well known in the art.

The aforementioned jamming or stalling failure is precluded in the instant invention by novel construction and by the cooperative action of retaining ring 37, the shoulder on member 48, the springs 38, $38_1$, and 57, and the coupling 19. During a return stroke of the solenoid 21 the spring washer 38 permits the wheel 36 and shaft 34 to move away from the wheel 29 when contacted by the teeth of the latter. This axial movement is normally absorbed by the coupling 19. If for any reason the entire axial movement is not absorbed by the coupling 19 the shaft 43 is free to move to the left until the washer 58 is bottomed in the counterbore 56. This is due to the fact that proper clearance is provided between the shaft 43, driving disk 51, and member 48 to allow such axial movement. During a return stroke of the solenoid 44 the spring washers 38₁ and 57 permit the ratchet wheel assembly 47 to move away from wheel 46 when contacted by the teeth of the latter. This axial movement is not transmitted to the shafts 43 or 34 for reasons which will be apparent in view of the immediately preceding explanation. Accordingly it is apparent that the balls of each of the ball bearing means 27 remain in contact with their respective races throughout power and return strokes of either solenoid. As soon as the teeth of either pair of mating ratchet wheels have cleared each other the respective driven ratchet wheel will be returned to its predetermined axial position. Accordingly it is seen the possibility of the aforementioned failure due to jamming or stalling is eliminated.

As mentioned above the coupling 19 relieves the requirement of accurate alignment between the two solenoids 21 and 44. In this connection the coupling 19 is of a type not only allowing angular misalignment but is constructed in a well known manner so that one of its ends may move axially without imparting motion to its other end. Also the inherent flexibility of the coupling provides a cushioning effect at such times as the teeth of a driving wheel contacts the mating teeth of a driven wheel during the power stroke of a solenoid.

Figure 2:
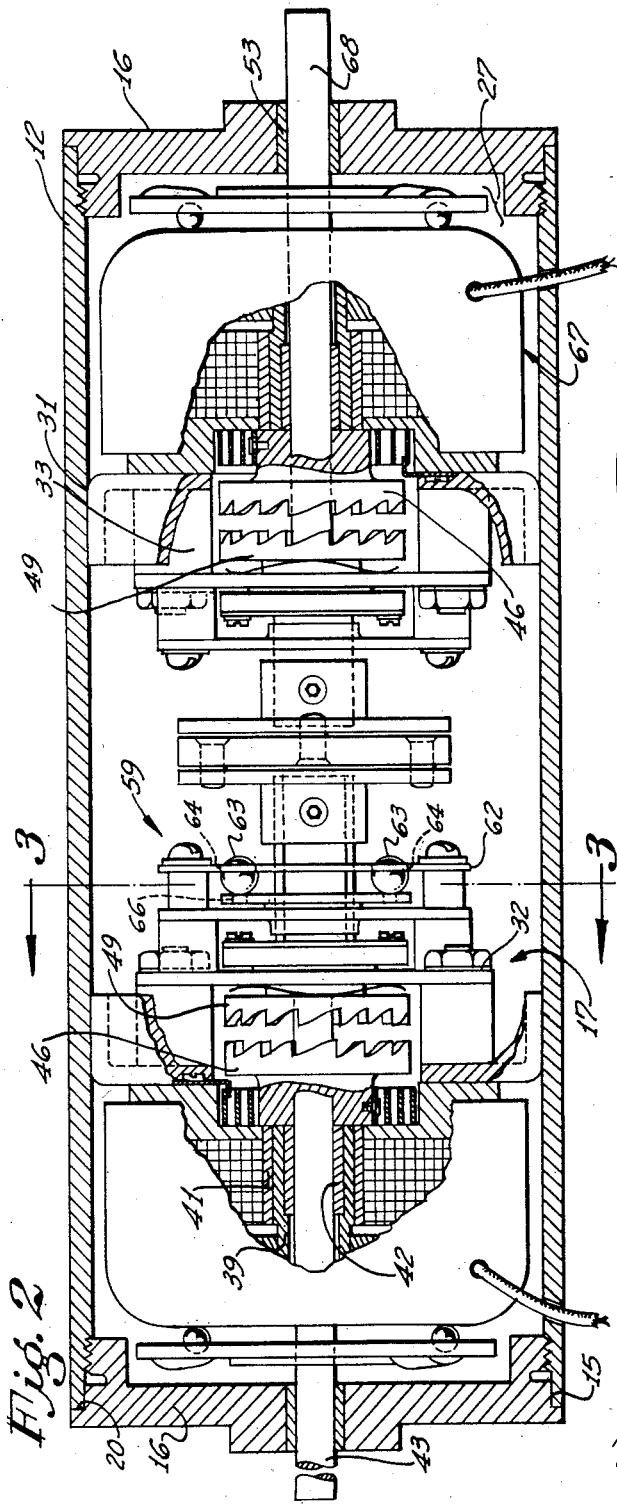
Figure 2 is a view similar to Figure 1 of another embodiment of a stepper motor as disclosed herein.
Figure 3:
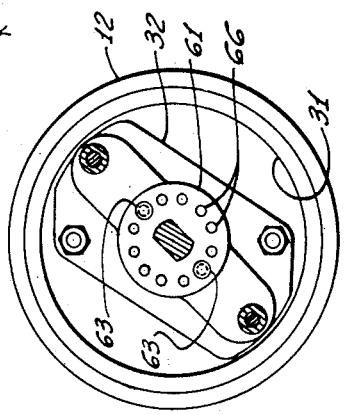
Figure 3 is a sectional view of the stepper motor shown in Figures 1 and 2 taken on the line 3—3 thereof.

Figure 2 shows another embodiment of the stepper motor of the instant invention. In this embodiment the housing 12 is substantially the same as that shown in Figure 1, however, in this embodiment identical cap members 16 are threadably secured to each end of the housing. The solenoid assembly 17 remains unchanged as shown in Figure 1. Solenoid assembly 67, shown at the right in Figure 2, is the same as solenoid assembly 17 except that the left end of its output shaft 68 is not as long as the corresponding portion of shaft 43 as it does not carry a detent assembly. The detent assembly 59 functions to hold both output shafts 43 and 68 as well as both ratchet wheels 49 in their correct angular position. The shaft 68 extends through a bearing 53 in the cap 16 located at the right end of housing 12. Accordingly this embodiment is provided with an output shaft extending from each end of the housing 12.

The relative relation of component parts and the operation of the embodiment shown in Figure 2 is substantially the same as that disclosed in connection with Figure 1. Accordingly it will be apparent how the motor shown in Figure 2 functions and further explanation in this respect is deemed unnecessary.

The present construction permits the output shaft 43 of Figure 1 and the output shafts 43 and 68 of Figure 2 to move small axial distances without imparting any axial movement to the assemblies 47. Such axial movement may be imparted to the aforementioned shafts by apparatus attached thereto. Axial movement of the above shafts is made possible by spring washers 57 and the coupling 19.

Various increments, angular ranges, longitudinal stroke distances, number of teeth, and mechanical arrangements, in connection with either the embodiment shown in Figures 1 or 2, may be selected in a manner taught herein without departing from the spirit of the invention.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In a motor of the class described; the combination comprising a rotary solenoid unit of the inclined race type having an operating shaft movable between initial and extended positions; said shaft assuming said initial position when said unit is de-energized; said shaft moving with combined axial and rotary movement to said extended position when said unit is energized and being returned with said axial and rotary movement to said initial position when said unit is de-energized; driving means secured to an end of said shaft for movement therewith; rotatable driven means having a rest position in which said driven means is mounted in spaced opposing relation with respect to said driving means when the latter is in a position assumed when said shaft is in said initial position; resilient means continuously urging said driven means toward said driving means and allowing said driven means to move axially from said rest position a predetermined distance in a direction away from said driving means; retainer means preventing said driven means from moving axially from said rest position in a direction toward said driving means; said driving means adapted to contact and rotate said driven means through a predetermined arc when said unit is energized; and an output shaft connected to said driven means for rotation therewith.

2. A motor of the class described, comprising: a pair of rotary solenoid units of the inclined race type each having an operating shaft movable between initial and extended positions; said shafts assuming said initial positions when said units are de-energized; said shafts moving with combined axial and rotary movement to said extended positions when said units are energized and being returned with said axial and rotary movement to said initial positions when said units are de-energized; a pair of driving means individually secured to an end of each of said shafts and having first and second positions corresponding to the initial and extended positions of said shafts, respectively; a elongated housing mounting said units in axial spaced alignment so that upon energizing said units their operating shafts move axially toward each other; first rotatable driven means having a rest position in which said first driven means is mounted in spaced opposing relation to one of said driving means when the latter is in said respective first position; second rotatable driven means having a rest position in which said second driven means is mounted in spaced opposing relation to the other of said driving means when the latter is in said respective first position; coupling means drivingly connecting said first and second driven means; resilient means continuously urging said first and second driven means toward said respective driving means and allowing said first and second driven means to move axially from said rest positions thereof in a direction away from respective opposing driving means; retainer means preventing said first and second driven means from moving axially from said rest positions thereof in a direction toward respective driving means; both of said driving means adapted to rotate said first and second driven means through a predetermined arc in moving between said first and second positions; and at least one output shaft connected to said first and second driving means for rotation therewith.

3. A motor as set forth in claim 2, further characterized in that one of said driving means imparts clockwise movement and the other of said driving means imparts counter-clockwise movement to said output shaft in moving from said first to said second positions.

4. A motor as set forth in claim 3, further characterized by including two output shafts, an end of one output shaft extending beyond one end of said housing and an end of the other output shaft extending beyond the other end of said housing.

5. A motor as set forth in claim 4, further characterized by including detent means attached to one of said solenoid units and adapted to retain said first and second driven means and said output shafts in a plurality of predetermined angular positions.

6. In a motor of the class described: the combination comprising a rotary solenoid unit of the inclined race type having a hollow operating shaft movable between initial and extended positions; said shaft assuming said initial position when said unit is de-energized; said shaft moving with combined axial and rotary movement to said extended position when said unit is energized and being returned with said axial and rotary movement to said initial position when said unit is de-energized; driving means secured to an end of said shaft for movement therewith; rotatable driven means having a rest position in which said driven means is mounted in spaced opposing relation with respect to said driving means when the latter is in a position assumed when said shaft is in said initial position; resilient means continuously urging said driven means toward said driving means and allowing said driven means to move axially from said rest position a predetermined distance in a direction away from said driving means; retainer means preventing said driven means from moving axially from said rest position in a direction toward said driving means; said driving means adapted to contact and rotate said driven means through a predetermined arc when said unit is energized; and an output shaft mounted within said operating shaft for rotational and axial movement therein and extending from both ends thereof; said output shaft being operationally connected to said driven means whereby rotational movement of the latter is transmitted to said output shaft.

7. A motor as set forth in claim 6, including detent means attached to said solenoid unit and adapted to retain said driven means and output shaft in a plurality of predetermined angular positions.

8. A motor as set forth in claim 7, including resilient means allowing limited axial movement of said output shaft with respect to said housing.

9. A motor of the class described, comprising: a pair of rotary solenoid units of the inclined race type each having a hollow operating shaft movable between initial and extended positions; said shafts assuming said initial positions when said units are de-energized; said shafts moving with combined axial and rotary movement to said extending positions when said units are energized and being returned with said axial and rotary movement to said initial position when said units are de-energized; a pair of driving means individually secured to an end of each of said shafts and having first and second positions corresponding to the normal and extended positions of said shafts, respectively; a housing mounting said units in axial spaced alignment so that upon energizing said units their operating shafts move axially toward each other; first rotatable driven means having a rest position in which said first driven means is mounted in spaced opposing relation to one of said driving means when the latter is in said respective first position; second rotatable driven means having a rest position in which said second driven means is mounted in spaced opposing relation to the other of said driving means when the latter is in said respective first position; resilient means continuously urging said first and second driven means toward said respective driving means and allowing said first and second driven means to move axially from said rest positions thereof in a direction away from respective opposing driving means, retainer means preventing said first and second driven means from moving axially from said rest positions thereof in a direction toward respective driving means; a first output shaft mounted within one of said operating shafts and a second output shaft mounted within the other of said operating shafts for axial movement therein and extending from both ends of respective operating shafts; said first driven means contacting said first output shaft and said second driven means contacting said second output shaft whereby angular movement of said first and second driven means is transmitted to said first and second output shafts, respectively; and coupling means drivingly connecting adjacent ends of said first and second output shafts.

10. A motor as set forth in claim 9, further characterized in that said first driving means imparts clockwise movement and said second driving means imparts counterclockwise movement to said output shafts in moving from said first to said second positions.

11. A motor as set forth in claim 10, including detent means attached to one of said solenoid units and adapted to retain said first and second driven means and said output shafts in a plurality of predetermined angular positions.

12. A motor as set forth in claim 11, including resilient means allowing limited axial movement of said first and second output shafts with respect to said housing.

13. In a motor as set forth in claim 1: further characterized in that said resilient means constitutes a spring washer surrounding said output shaft and bearing on said driven member and stationary portions of said unit.

References Cited in the file of this patent

UNITED STATES PATENTS

| | | |
|---|---|---|
| 1,749,722 | Stevens | Mar. 4, 1930 |
| 2,496,880 | Leland | Feb. 7, 1950 |
| 2,541,872 | Hendricks | Feb. 13, 1951 |